(12) United States Patent
Orlick et al.

(10) Patent No.: US 8,687,693 B2
(45) Date of Patent: Apr. 1, 2014

(54) TEMPORAL IMAGE PREDICTION

(75) Inventors: Christopher J. Orlick, Washington Crossing, PA (US); Richard Webb, McKinney, TX (US); Scott Miller, Harleysville, PA (US); Jerome Shields, Lumberton, NJ (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 824 days.

(21) Appl. No.: 12/745,502

(22) PCT Filed: Nov. 21, 2008

(86) PCT No.: PCT/US2008/084395
§ 371 (c)(1),
(2), (4) Date: Sep. 22, 2010

(87) PCT Pub. No.: WO2009/073415
PCT Pub. Date: Jun. 11, 2009

(65) Prior Publication Data
US 2012/0281758 A1    Nov. 8, 2012

Related U.S. Application Data

(60) Provisional application No. 60/991,677, filed on Nov. 30, 2007.

(51) Int. Cl.
*H04N 7/12* (2006.01)
(52) U.S. Cl.
USPC ............................................. 375/240.12
(58) Field of Classification Search
USPC .................. 375/240, 240.01, 240.12, 240.14, 375/240.16
See application file for complete search history.

(56) References Cited

U.S. PATENT DOCUMENTS 5,057,921 A    10/1991   Robert et al.
6,249,318 B1    6/2001   Girod et al.
(Continued)

FOREIGN PATENT DOCUMENTS

CN    1744719 A    3/2006
EP    0817499 A2    1/1998
(Continued)

OTHER PUBLICATIONS

A. Tamtaoui et al. "Constrained Disparity and Motion Estimators for 3DTV Image Sequence Coding" Signal; Processing: Image Communication 4 (1991), pp. 45-54.

(Continued)

*Primary Examiner* — Allen Wong
(74) *Attorney, Agent, or Firm* — Hickman Palermo Truong Becker Bingham Wong LLP; Kirk D. Wong

(57) ABSTRACT

For frames sequentially functioning as a reference frame in a video sequence frame set, a motion estimate set is accessed. One motion estimate characterizes motion associated with pixels of each region of the reference frame in relation to regions of one frame of the set of frames, which is temporally displaced in time with respect to other frames in the set of frames. An additional motion estimate characterizes motion associated with pixels of each reference frame region in relation to a second frame of the set, which is temporally displaced from the one frame and other frames of the frame set. A temporal image prediction set, corresponding to the first and additional motion estimate, is predicted, based on an alignment of the reference frame regions over the frame set. The temporal image predictions are blended and a temporal predictor is generated over the frame set based on the blending.

25 Claims, 6 Drawing Sheets

(56) References Cited

U.S. PATENT DOCUMENTS

| | | |
|---|---|---|
| 6,442,202 B1 | 8/2002 | Borer |
| 7,095,344 B2 | 8/2006 | Sekiguchi et al. |
| 8,090,029 B2 | 1/2012 | Date et al. |
| 2001/0048720 A1 | 12/2001 | Koshiba et al. |
| 2002/0131503 A1 | 9/2002 | Nakamura |
| 2004/0001546 A1 | 1/2004 | Tourapis et al. |
| 2004/0184666 A1 | 9/2004 | Sekiguchi et al. |
| 2004/0190615 A1 | 9/2004 | Abe et al. |
| 2004/0233989 A1 | 11/2004 | Kobayashi et al. |
| 2004/0252230 A1 | 12/2004 | Winder |
| 2005/0013370 A1 | 1/2005 | Kim et al. |
| 2005/0190844 A1 | 9/2005 | Kadono et al. |
| 2005/0281473 A1 | 12/2005 | Kim et al. |
| 2006/0098886 A1 | 5/2006 | De Haan |
| 2006/0133503 A1 | 6/2006 | Park et al. |
| 2006/0203913 A1 | 9/2006 | Kim et al. |
| 2006/0215762 A1 | 9/2006 | Han et al. |
| 2006/0222067 A1 | 10/2006 | Park et al. |
| 2006/0222068 A1 | 10/2006 | Park et al. |
| 2006/0222069 A1 | 10/2006 | Park et al. |
| 2006/0222070 A1 | 10/2006 | Park et al. |
| 2007/0019721 A1 | 1/2007 | Le Leannec et al. |
| 2007/0064798 A1 | 3/2007 | Paniconi et al. |
| 2007/0064802 A1 | 3/2007 | Paniconi et al. |
| 2007/0064806 A1 | 3/2007 | Paniconi et al. |
| 2007/0064807 A1 | 3/2007 | Paniconi et al. |
| 2007/0091997 A1 | 4/2007 | Fogg et al. |
| 2007/0110153 A1 | 5/2007 | Cho et al. |
| 2007/0127576 A1 | 6/2007 | Henocq et al. |
| 2009/0116760 A1 | 5/2009 | Boon et al. |

FOREIGN PATENT DOCUMENTS

| | | |
|---|---|---|
| EP | 1032211 A2 | 8/2000 |
| EP | 1855474 A1 | 11/2007 |
| JP | 2003319403 | 11/2003 |
| JP | 2007-503775 | 2/2007 |
| JP | A 2007-081726 | 3/2007 |
| JP | A 2007-300380 | 11/2007 |
| WO | WO 2005/004492 A2 | 1/2005 |
| WO | WO 2005/022919 | 3/2005 |

OTHER PUBLICATIONS

Junavit Chalidabhongse "Fast Motion Vector Estimation Techniques for Video Coding" A Dissertation presented to the Faculty of the Graduate School, University of Southern California, May 1996, 118 pages.

PCT Notification of Transmittal of the International Search Report and Written Opinion, International application No. PCT/US2008/084395, mail date May 14, 2009, 18 pages.

Jianning Zhang et al "A Novel Spatial-Temporal Position Prediction Motion-Compensated Interpolation for Frame Rate Up-Conversion" Advances in Multimedia Information Processing—PCM 2006 Lecture Notes in Computer Science: LCNS. Springer. Berlin. DE. vol. 4261, Jan. 1, 2006, pp. 870-879.

Elias S. G. Carotti et al "Low-Complexity Lossless Video Coding Via Adaptive Spatio-Temporal Prediction" Proceedings 2003 International conference on Image Processing, ICIP-2003, Barcelona, Spain, Sep. 14-17, 2003, pp. 197-200.

Jelena Kovacevic et al "Deinterlacing by Successive Approximation" IEEE Transactions on Image Processing, IEEE Service Centea Pascataway, NJ, US vol. 6 No. 2, Feb. 1, 1997, 6 pages.

Shin-ichiro Koto et al "Adaptive Bi-predictive Video Coding Using Temporal Extrapolation" Proceedings 2003 International Conference on Image Processing, ICIP-2003, Barcelona Spain, Sep. 14-17, 2003, pp. 829-832.

S. Tubaro et al "Motion Field Estimators and Their Application to Image Interpolation" Motion Analysis and Image Sequence Processing, Jan. 1, 1993, pp. 153-187.

TEMPORAL IMAGE PREDICTION

TECHNOLOGY

The present invention relates generally to video processing. More specifically, embodiments of the present invention relate to temporal image prediction.

BACKGROUND

Moving image sequences may include multiple, sequential frames. Some modern image processing applications use estimates of motion in the images of moving image sequences. As used herein, the terms 'motion estimates' and 'motion estimation' refer to such estimates of motion. Motion estimates include parameters that describe motion between frame regions in segments of frames of a moving image sequence.

Image processing applications may estimate motion associated with various regions of the image frames of the moving image sequences. Applications may include or involve video compression, which relates to reducing the amount of data with which visual information is stored and conveyed (e.g., encoded, transmitted, received and decoded).

Motion estimates are a technique with which video compression applications achieve significant reduction in the data needed to represent image frames in moving image sequences. Applications may attempt to map, from one frame of a moving image sequence to another, translational or other motion of image regions within each of the frames. For instance, given a reference frame 'A' and a motion map that describes image motion from frame A to a subsequent frame 'B', a motion-predicted frame B can be formed by projecting the motion map from frame A. A difference frame B can be formed by subtracting the motion-predicted frame B from frame B.

Compression is achieved when the amount of data needed to encode both the motion map and the difference frame B is less than the amount needed for encoding frame B directly. Thus, an application may seek a motion map that yields a motion-predicted frame B that differs relatively little from frame B. For compression related purposes, the accuracy with which the motion map represents the actual motion of image features in the moving image sequence may not be a primary consideration. In other words, from the perspective of achieving compression, it may suffice that a given motion map simply reduces the amount of data needed to encode the motion map and the difference frame B.

Applications that use motion estimation may align an image feature, which appears in each of multiple frames of a moving image sequence, to a reference. A region of each frame in which the image feature appears is moved according to the motion estimate. The resulting set of image feature-aligned regions may then be blended, e.g., according to a formula. Accurate motion estimation can be important for accurately positioning feature-aligned regions between various frames of a moving image sequence.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
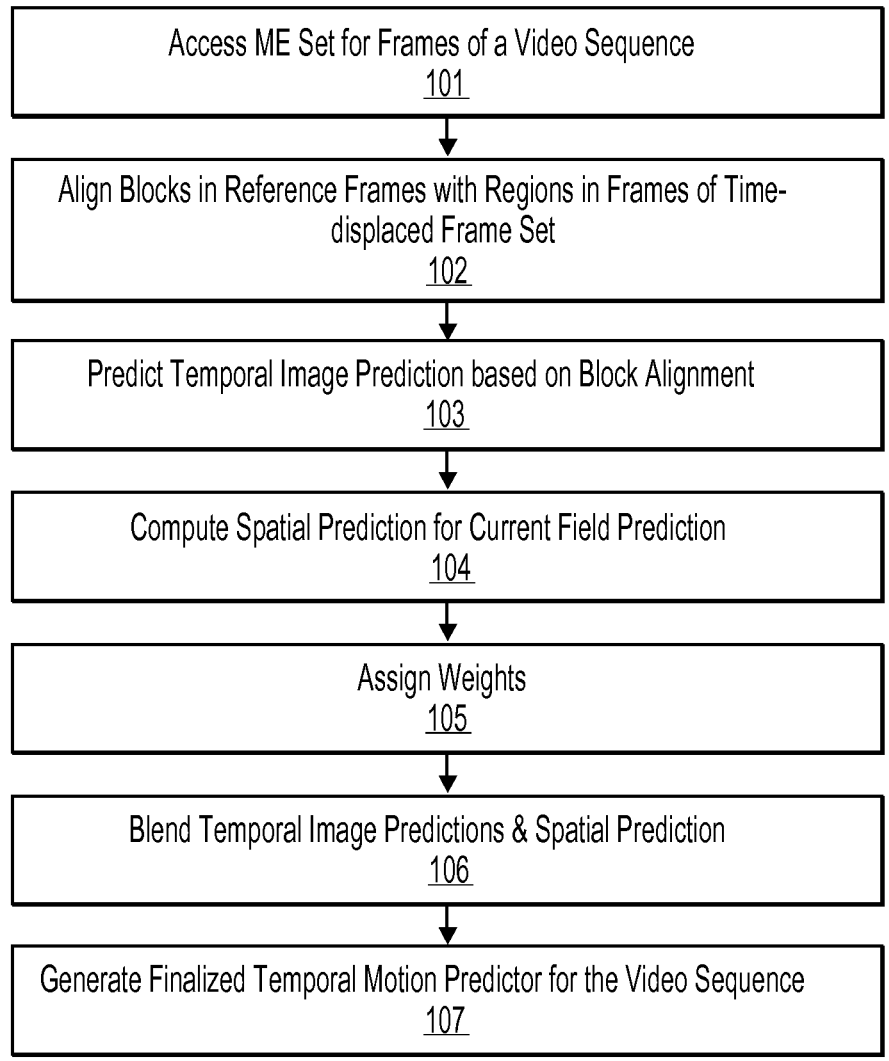
FIG. 1 depicts a flowchart for an example procedure, according to an embodiment of the invention.

Motion estimation and motion estimates may be significant in applications that make time related imaging predictions and motion compensated image processing. Temporal image prediction and motion compensation processing may be significant in electronic video devices, which are used in consumer, commercial, industrial, medical, research, surveillance, and other fields. Such devices may include, but are not limited to televisions (TV), players for digital versatile disks (DVD) and other optically encoded media such as Blu-Ray disks (BD) and HD-DVD, computers with graphical displays, cable, satellite and related receivers, tuners and the like, medical, scientific and other imaging systems, and high definition (HD) media such as HDTV.

Moreover, temporal image prediction and motion compensation processing may be significant in more "professional" settings and other somewhat more technologically demanding settings. Such professional and technical settings may include, but are not limited to broadcast station operations and settings in which upconversion of standard definition material, e.g., during creation of content, are performed. However, motion estimation and motion estimates may lack sufficient accuracy to be of optimal use in the applications, devices, and professional settings.

Temporal image prediction is described herein. In the following description, for the purposes of explanation, numerous specific details are set forth in order to provide a thorough understanding of the invention. It will be apparent, however, that the invention may be practiced without these specific details. In other instances, well-known structures and devices are not described in exhaustive detail, in order to avoid unnecessarily occluding, obscuring, or obfuscating the invention.

Overview

Images of a video sequence are processed. For one or more frames, which sequentially function as a reference frame in a set of frames of the video sequence, a set of motion estimates is accessed. The set of motion estimates includes a first motion estimate for each region of the reference frame. The first motion estimate characterizes motion that is associated with pixels of each of the regions of the reference frame in relation to regions of at least one frame of the frame set, in which the at least one frame is displaced in time with respect to other frames of the frame set. The set of motion estimates also includes at least one additional motion estimate. The at least one additional motion estimate characterizes motion that is associated with the pixels of each of the regions of the reference frame in relation to regions of at least a second frame of the frame set, in which the at least a second frame is displaced in time from the at least one frame and from other frames of the frame set. A set of temporal image predictions corresponding to the first and at least one additional motion estimate is predicted. The set of temporal image predictions is based on an alignment of the regions in the reference frame over the frame set. The set of temporal image predictions is blended. Based on blending the set of temporal image predictions, a temporal predictor is generated over the frame set.

Example embodiments described herein relate to temporal image prediction. In an example embodiment, images of a video sequence are processed. For one or more frames, which sequentially function as a reference frame in a set of frames of the video sequence, a set of motion estimates is accessed. The set of motion estimates includes a first motion estimate for each region of the reference frame. The first motion estimate characterizes motion that is associated with pixels of each of the regions of the reference frame in relation to regions of at least one frame of the frame set, in which the at least one frame is displaced in time with respect to other frames of the frame set. The set of motion estimates also includes at least one additional motion estimate. The at least one additional motion estimate characterizes motion that is associated with the pixels of each of the regions of the reference frame in relation to regions of at least a second frame of the frame set, in which the at least a second frame is displaced in time from the at least one frame and from other frames of the frame set. A set of temporal image predictions corresponding to the first and at least one additional motion estimate is predicted. The set of temporal image predictions is based on an alignment of the regions in the reference frame over the frame set. The set of temporal image predictions is blended. Based on blending the set of temporal image predictions, a temporal predictor is generated over the frame set.

The finalized temporal prediction generated for the video sequence may comprise an output. In an embodiment, a spatial prediction can also be generated from each currently functional reference frame. The spatial prediction may be combined with the temporal prediction to create a spatio-temporal predictor, which alternatively or additionally may comprise an output. The blended temporal predictor output or the spatio-temporal predictor output may comprise a finalized prediction output.

The output blended temporal predictor and/or the spatio-temporal predictor may be provided to one or more video applications. The video applications may use the temporal predictor or spatio-temporal predictor for any of a number of purposes.

The video sequence (e.g., video stream) and the set of motion estimates may be received or otherwise accessed, e.g., from storage media. The set of motion estimates may be accessed from a single or multiple sources. The sources may include a substantially direct motion estimation source, a source of compressed motion estimates, a source of spatially refined motion estimates, and/or a source of motion estimates that essentially align one or more image features which appear in each of multiple frames of a moving image sequence, to a reference frame.

Various motion estimates may be used with embodiments of the invention. The motion estimates can include a pair of orthogonally related vector components that describe translational motion that may be associated with one or more of the regions between one or more of the frames of the video sequence. The motion estimates can also include an angular component that describes a rotational motion associated with one or more regions between one or more of the frames of the sequence. Further, the motion estimates can include additional parameters, with which more complex or elaborate motion in a video sequence may be described. For instance, the motion estimates can include six or more mapping parameters that describe an affine motion, such as warping and shearing, which may occur in or be associated with one or more regions between one or more of the frames of the sequence.

In the description of example embodiments herein, blocks may be used as an example of a frame region. Likewise, translational motion may be used herein as an example of a motion description. Blocks may be used as an example of frame regions and translational motion as an example of motion attributes over a frame set, in general, and solely for simplicity, unity, clarity and/or brevity in the description herein. However, it should be clearly understood that, while blocks and translational motion may be used herein as examples, this usage is not to be considered limiting. On the contrary, embodiments of the invention are well suited to function with frame regions and motion attributes of virtually any respective attribute or description.

In an embodiment, one or more temporal image predictions are interpolated. These temporal image predictions are associated with the motion of the pixels of the reference frame in relation to regions of at least one frame of the frame set. The temporal image predictions are interpolated with fractional pixel phase accuracy. Based on the interpolation, an interpolation based weight is assigned to the temporal prediction. Blending the set of temporal image predictions may thus include computing the finalized temporal prediction based, at least partially, on the assigned interpolation based weights.

In an embodiment, an accuracy associated with each of the motion estimates is estimated. Based on the accuracy associated with the motion estimate, an accuracy based weight is assigned thereto. Blending the set of temporal image predictions may thus include computing the finalized temporal prediction based, at least partially, on the assigned accuracy based weights.

In an embodiment, a noise component may be associated with compression of the video image. An estimation may be received that relates to such compression noise associated with the video image. A compression noise based weight is assigned, based on an estimated noise component, to each of the motion estimates. Blending the set of temporal image predictions may thus include computing the finalized temporal prediction based, at least partially, on the compression noise based weights.

In an embodiment, a spatial prediction is computed for each region of the reference frame. Blending the set of temporal image predictions may thus include blending the spatial prediction with the multiple temporal predictions. A spatio-temporal prediction for the video image is thus generated, e.g., as a finalized output prediction.

In a related embodiment, an accuracy associated with the spatial prediction is estimated. Based on the accuracy associated with the spatial prediction, a spatial prediction accuracy based weight is assigned to the spatial prediction. Blending the set of temporal image predictions may thus be based, at least partially, on the spatial prediction accuracy based weight.

In an embodiment, a computer system performs one or more features described above. The computer system includes one or more processors and may function with hardware, software, firmware and/or any combination thereof to execute one or more of the features described above. The processor(s) and/or other components of the computer system may function, in executing one or more of the features described above, under the direction of computer-readable and executable instructions, which may be encoded in one or multiple computer-readable storage media and/or received by the computer system.

In an embodiment, one or more of the features described above execute in a decoder, which may include hardware, software, firmware and/or any combination thereof, which functions on a computer platform.

Example Procedures

The example procedures described herein may be performed in relation to temporal image prediction. Procedures that may be implemented with an embodiment may be performed with more or less steps than the example steps shown and/or with steps executing in an order that may differ from that of the example procedures. The example procedures may execute on one or more computer systems, e.g., under the control of machine readable instructions encoded in one or more computer readable storage media, or the procedure may execute in an ASIC or programmable IC device.

FIG. 1 depicts a flowchart for an example procedure 100, according to an embodiment of the invention. Procedure 100 achieves temporal image prediction in processing images of a video sequence. In step 101, for one or more frames, which sequentially function as a reference frame in a set of frames of the video sequence, a set of motion estimates (ME) is accessed. The set of motion estimates may be received with a compressed video stream or stored upon decoding the compressed video sequence and retrieved from storage media. Several motion estimates may comprise the set. The set of motion estimates may also be obtained from another source (other than compressed video sequence/bit stream), including directly performing motion estimation.

The set of motion estimates includes a first motion estimate for each region of the reference frame. The first motion estimate characterizes motion that is associated with pixels of each of the regions of the reference frame in relation to regions of at least one frame of the frame set, in which the at least one frame is displaced in time with respect to other frames of the frame set. The set of motion estimates also includes at least one additional motion estimate. The at least one additional motion estimate characterizes motion that is associated with the pixels of each of the regions of the reference frame in relation to regions of at least a second frame of the frame set, in which the at least a second frame is displaced in time from the at least one frame and from other frames of the frame set.

In step 102, the blocks or other regions of the reference frame are aligned with corresponding regions of at least one frame of the frame set. The regions may be aligned with techniques described in PCT Application number [yet to be assigned], filed on Nov. 21, 2008, by Jerome D. Shields and Christopher J. Orlick, which is entitled "Temporally Smoothing a Motion Estimate," is incorporated herein by reference for all purposes as if fully set forth herein.

Based on the alignment of the regions, a set of temporal image predictions are predicted in step 103. Each of the temporal image predictions in the set corresponds with the frames in the frame set.

In block 104, a spatial prediction may be computed for the reference frame of the video sequence. An accuracy associated with the spatial prediction may be estimated.

In block 105, weights for each prediction may be assigned. For instance, a weight may be assigned to the spatial prediction based on its estimated accuracy. Moreover, weights may be added to the temporal image predictions. For instance, an accuracy value may be associated with each of the motion estimates. Further, noise may be associated with compression of the video sequence. A compression noise component may be estimated or received with the decoded video sequence. A weight may be assigned to each of the temporal image predictions based on the value of the compression noise component. For another example, a value associated with the motion of the pixels of the reference frame in relation to regions of at least one frame of the frame set may be used for interpolation of a temporal image prediction and may include a fractional pixel phase value. A weight that is based on the fractional pixel interpolation may be assigned to the temporal image prediction associated with the pixels of the current frames.

In step 106, the temporal predictions are blended together, along with any spatial prediction. In block 107, a finalized spatio-temporal predictor is generated for the frames of the video sequence based on the blended temporal image predictions. In an embodiment, any spatial prediction may be blended with blended temporal image predictions, to generate the spatio-temporal predictor for the frames of the video sequence.

Example System

Figure 2:
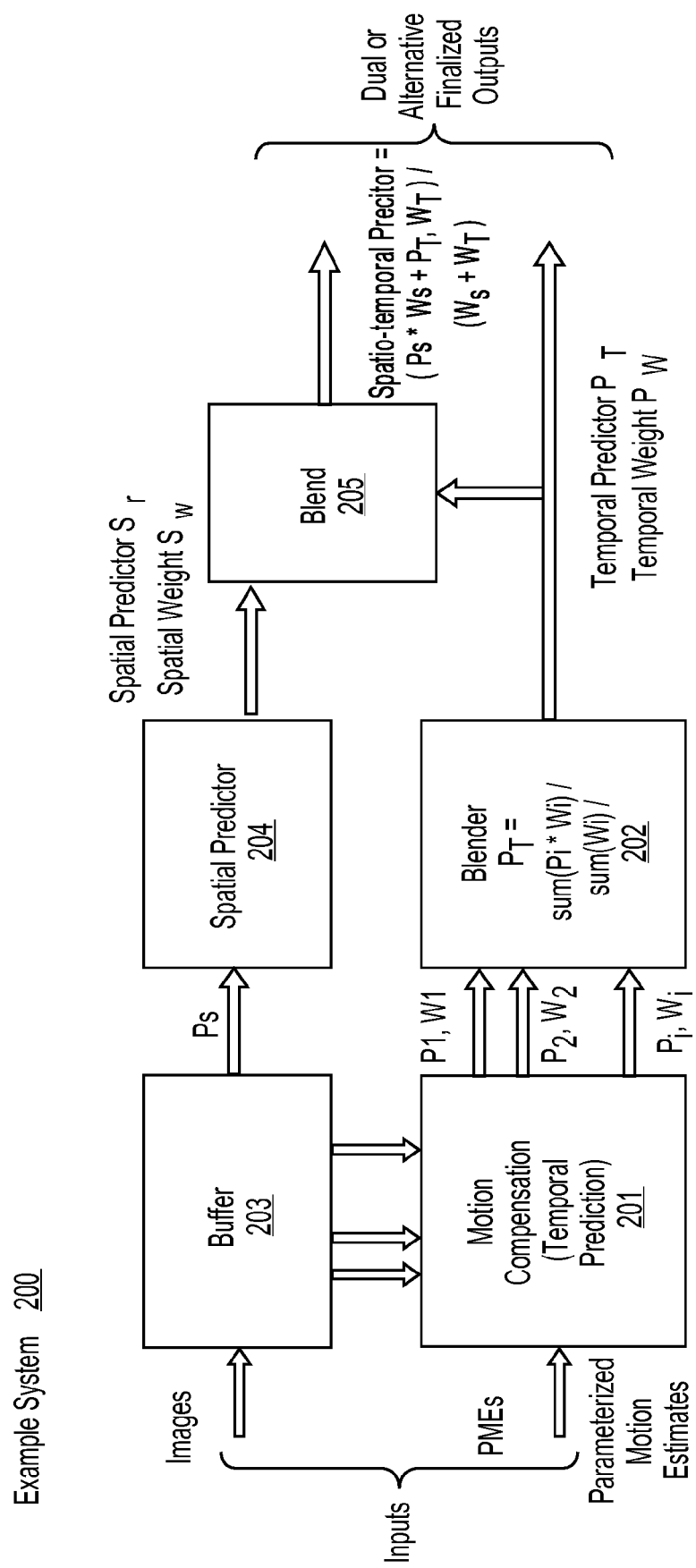
FIG. 2 depicts an example system, according to an embodiment of the invention.

FIG. 2 depicts an example system 200, according to an embodiment. System 200 performs a temporal image prediction function. For instance, system 200 may function to execute parts of procedure 100, as described above with reference to FIG. 1.

System 200 may be configured with one or more components of a computer system and/or with an ASIC or a programmable IC device. System 200 may be disposed within a decoder, an encoder, in professional video editing and/or processing systems, scientific, in medical or other imaging systems, and in any of a variety of computers, communication devices, network elements, TVs, and players for various kinds of video media, including HD media.

System 200 has a buffer 203. Images such as the frames of a video sequence are stored in a buffer 203. Buffer 203 provides the frames to a motion compensation unit 201.

Upon receiving frames of the video sequence from buffer 203 and motion estimates associated with blocks of the frames, accuracy and interpolation scores and/or with values for compression noise associated with the video sequence, motion compensation unit 201 predicts temporal predictions for the frames. Motion compensation unit 201 also functions to assign weights to the motion estimates, based on the accuracy and interpolation scores and compression noise values. Motion compensation unit 201 provides its temporal predictions $P_1, \ldots, P_i$ for the frames, and their corresponding weights $W_1, \ldots, W_i$ that it assigns, to a blending unit 202.

Blending unit 202 functions to blend the temporal predictions $P_1, \ldots, P_i$ together into a finalized temporal predictor $P_T$. In blending temporal predictions $P_1, \ldots, P_i$ into the finalized temporal predictor $P_T$, blending unit 202 may use the assigned weights $W_1, \ldots, W_i$.

Blending unit 202 may compute the finalized temporal predictor $P_T$ from the temporal image predictions $P_1, \ldots, P_i$ and the assigned weights $W_1, \ldots, W_i$ according to a formula such as that given by Equation 1, below.

$$P_T = \frac{\sum_{n=1}^{i} (P_n W_n)}{\sum_{n=1}^{i} W_n}. \qquad \text{Equation 1}$$

Inputs used by system 200 in its temporal image prediction functions may include the original video sequence, motion estimates, which describe relative motion between frames of the video sequence, a score that provides a measure of the accuracy of the motion estimates, and an estimate of compression noise in the video sequence. The temporal image prediction function of system 200 essentially combines motion compensated temporally proximate frames, e.g., "temporal neighbors," of each image and thus effectuates high quality video processing in applications such as noise reduction, de-interlacing, and scaling and/or upconversion.

The first stage of the temporal image prediction function of system 200 is related to motion compensated filtering for aligning the temporal neighbors, based on motion estimates, to generate temporal predictors. The temporal predictors are then blended together to form the finalized temporal predictor $P_T$. Blending weights may be based on a variety of data, including a score that estimates the accuracy of the motion predictors, estimated image compression noise, and noise introduced by motion compensation filtering based alignment.

A spatial predictor 204 accesses spatial information relating to the reference frame from buffer 203. Spatial predictor 204 calculates a spatial prediction from the reference field (e.g., frame). The spatial predictor and weights associated therewith (e.g., as discussed below with reference to FIG. 5) and the final temporal predictor $P_T$ may be provided to a spatio-temporal blending unit 205. Weighting for the spatial and temporal predictors is based on scores associated with the motion estimates and estimates of the quality of the spatial predictor.

Accurate estimates of motion in video image sequences are used to achieve temporal image prediction. For the purposes of motion estimation, a video frame, referred to herein as the reference frame (or "reference field" or "one or more frames of a video sequence") is divided into regions, such as a set of component rectangular blocks. It should be appreciated that embodiments of the invention are well suited to function with regions that conform to virtually any configuration. Blocks are used herein as an example of such regions. A motion estimate is found for each block in the reference frame that best characterizes the movement of the pixels in that block with respect to another frame. Each block in the reference field may have multiple motion estimates, each of which describes the motion between the block and a different, e.g., subsequent other frame at a different time displacement with respect to both the reference frame and the original another frame.

Motion estimates may be accessed from one or more of a variety of sources. The motion estimates may be obtained by direct motion estimation. The motion estimates may also be obtained by a combination of techniques including, but not limited to, prediction from compressed motion vectors or other motion estimates, spatial refinement, and smoothing operations performed with filtering on motion estimates.

Figure 3:
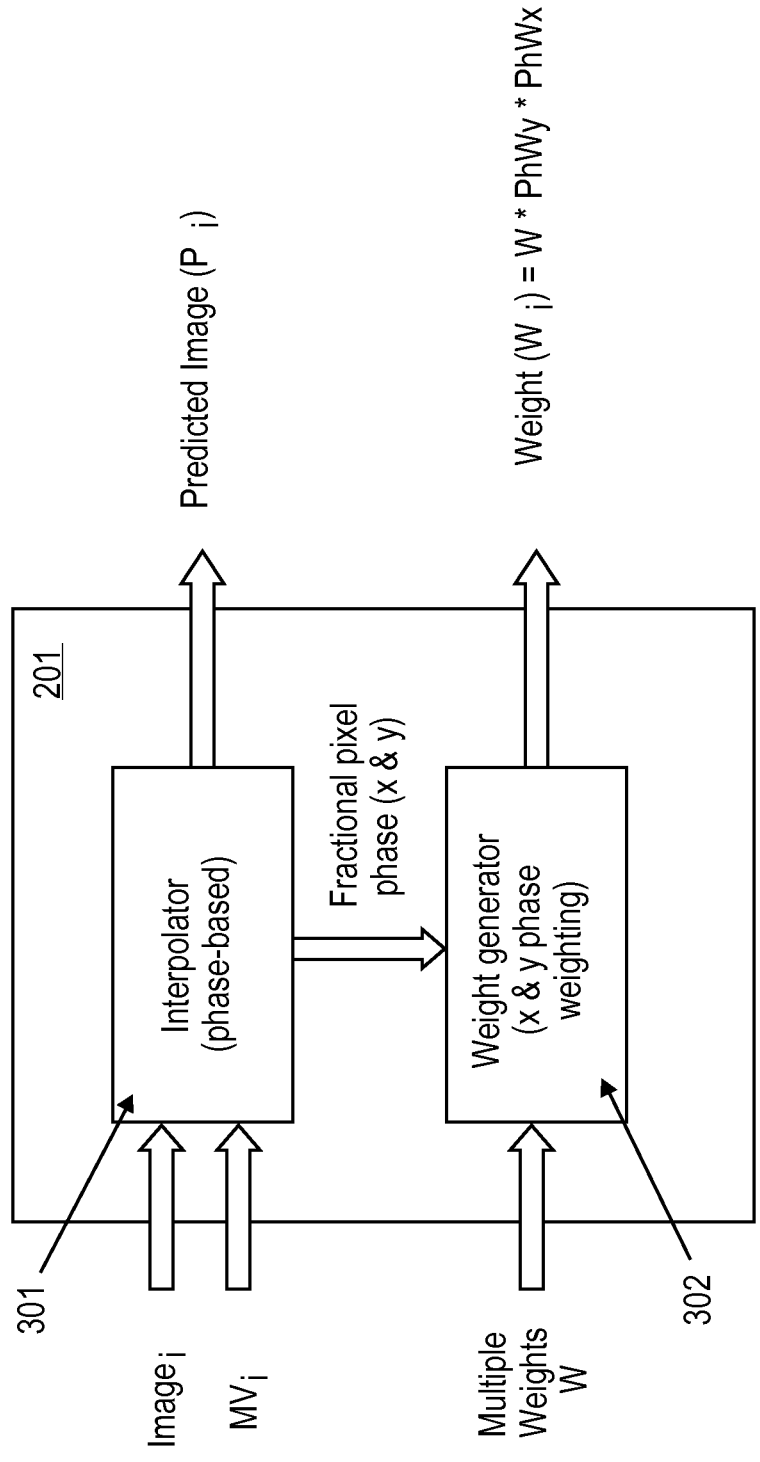
FIG. 3 depicts an example system component, according to an embodiment of the invention.

Temporal prediction unit 201 uses motion estimates to create multiple temporal predictions from the other frames. FIG. 3 depicts an example temporal prediction unit 201, according to an embodiment. Temporal prediction unit 201 has a phase based interpolator 301 functionally coupled with a weight generator 302. Phase based interpolator 301 uses motion compensation interpolation filters to align the pixel data from the image information and motion estimates of each other field (e.g., other frame). Interpolator 301 thus creates a set of fractional pixel phase data, which are used as temporal predictors. The set of temporal predictor weighting functions are blended together by weight generator 302 (including weighting functions related to scores associated with the motion estimates, interpolation filter phase, and compression noise). Weight generator 302 generates a composite weight from all available weighting terms. Blender 202 uses the composite weight to blend the set of temporal predictors.

The primary weighting term may comprise the score associated with the motion estimates. The score is assumed available and provides an estimate of the accuracy of the predicted data based on the accuracy of the motion estimation. The score can be the direct block (or other regional) match difference, such as the sum-of-absolute-differences (SAD). Lower scores may be interpreted to correspond to better matches. The score is translated to a weight by an inverse relation, such as (1/score) or (1/score$^2$). The inverse relation gives the desired relationship of low scores, e.g., good matches, having higher weighting than high scores, e.g., poor matches, upon combining temporal predictors.

The interpolation filter phase weight term is used both because motion estimates may be expected to have sub-pixel motion accuracy, and because predicted output locations, e.g., for de-interlacing and scaling or upconversion applications, may have essentially arbitrary sub-pixel location relative to the current frame. In both cases, interpolation filter functions of interpolator 301 thus shifts the reference pixels. The shifting required between actual reference pixels and the required sub-pixel output location is referred to herein as the phase. A phase of zero represents substantially no (zero) shift. In contrast, a maximum phase essentially corresponds to half the spatial frame distance between two reference pixels. Where the distance between two pixels is defined to be a value N, the largest phase shift is effectively N/2.

The bandwidth response of real interpolation filters is essentially imperfect. Thus, minimal or zero phase shifting creates output pixels with no interpolation or phase shift. From this perspective, non-interpolated output pixels with no phase shift are thus the best possible, whereas output pixels with a half-pixel shift are the least desirable. Weight generator 302 adjusts the weighting for each predicted output $P_i$ based on the phase of the filter with which interpolator 301 creates the predicted output. For example, weighting is decreased as the interpolation phase approaches N/2.

It should be appreciated that, for scaling and deinterlacing applications, each output pixel within a given block can have unique interpolation phases even though it has the same motion estimates as the other pixels in the block. The phase-weighting calculations are thus computed by weight generator 302 on a per-pixel basis, as appropriate.

A weighting term from the compression noise estimate of the reference frame may also be applied by weight generator 302. Other frames with high compression noise may have their weighting reduced.

The relative accuracy of each temporal prediction is generated by combining, e.g., by multiplying, each of the inverse score weight (1/score$^2$), horizontal and vertical phase weights (e.g., φWx and φWy), and compression noise weights. The set of temporal predictions are then combined, based at least in part on one or more of these three weights, to create the finalized temporal prediction $P_T$.

A spatial prediction $P_S$ is created from the reference frame for each output pixel. The finalized temporal predictor $P_T$ and the spatial predictions $P_S$ are combined via a weighting scheme to create a spatio-temporal prediction, which may comprise a final output prediction from system 200 (FIG. 2). The weighting scheme for the spatial predictor is a unique measure that provides for effectively using the spatial predictor when sufficient temporal information is largely unavailable. The weighting scheme also allows significant temporal contribution when the motion estimates suffice.

Weighting each spatial predictor in the reference field allows the spatial predictors to be combined with the temporal prediction. As a first step in generating the spatial predictor weight, a spatial prediction "score" is calculated. The spatial prediction score quantifies a quality of the spatial prediction, relative to temporal image predictions for a given area of a frame region. Quality of temporal predictions is related to the difference between the actual pixel data and the temporal data that is indicated by the motion estimate. An embodiment may thus quantize a relative quality score for a temporal image prediction as follows. Areas of low image detail in a reference frame may be expected to be associated with scores for good temporal predictions that are relatively low. Conversely, high detail areas of a reference frame may have temporal predictor scores that are relatively high, but which may be considered sufficient. A score for a reference field is thus created to characterize an amount of energy or detail in each block or other region. In an embodiment, a temporal predictor quality score thus provides a sliding scale, with which the quality of the temporal predictors may be evaluated.

Figure 4:
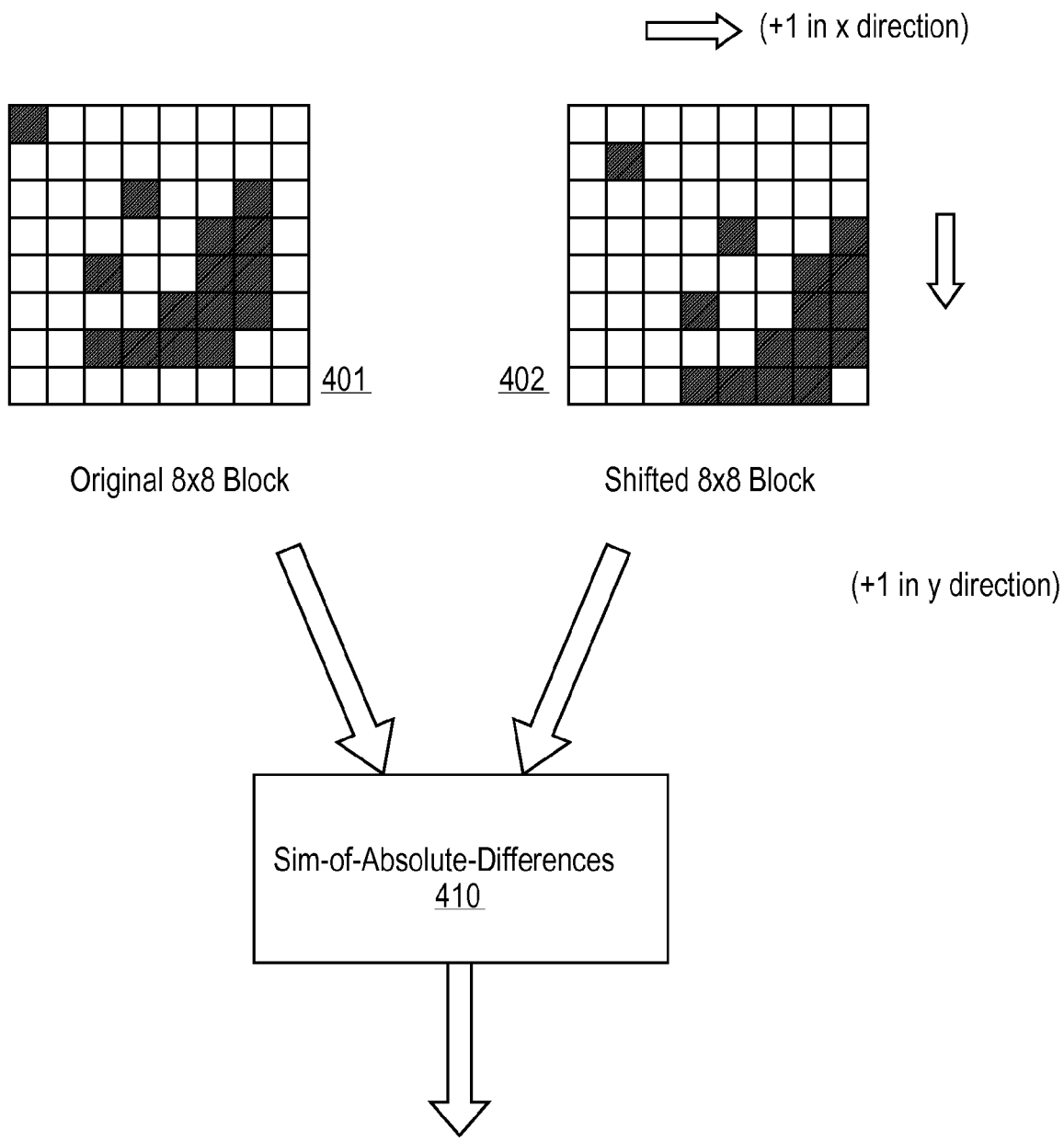
FIG. 4 depicts an example operation, according to an embodiment of the invention.

FIG. 4 depicts an example operation 400, according to an embodiment. Measures such as variance within a block or other region may be used in some embodiments. A technique that correlates relatively closely with the temporal prediction score is based, in an embodiment, on the SAD 410. The SAD 410 is calculated for the reference block 401, with respect to a shifted block 402. Shifted block 402 is essentially the original block 401, shifted by one pixel in, e.g., each of a horizontal 'x' and a vertical 'y' direction (for translational motion depicted between frames 401 and 402). This shift equates to the score for a motion estimation if the motion was off by exactly one pixel along each x and y axis. It should be appreciated that blocks are shown herein by way of example and not limitation; embodiments are well suited to function over any region of frames.

A motion estimate that is off by a single pixel in each of these orthogonally related spatial dimensions is essentially a "roughly correct" motion estimate. However, a roughly accurate motion estimate may not be sufficiently accurate in some applications. In an embodiment, this accuracy dichotomy provides a measure to evaluate the temporal predictor scores. A reference field score may thus be scaled higher or lower to influence the relative weighting of temporal and spatial prediction. In an implementation, the reference frame may be pre-filtered or otherwise processed to reduced noise prior to score calculation. This may more accurately approximate the SAD calculations used to generate the scores for the motion estimates.

Figure 5:
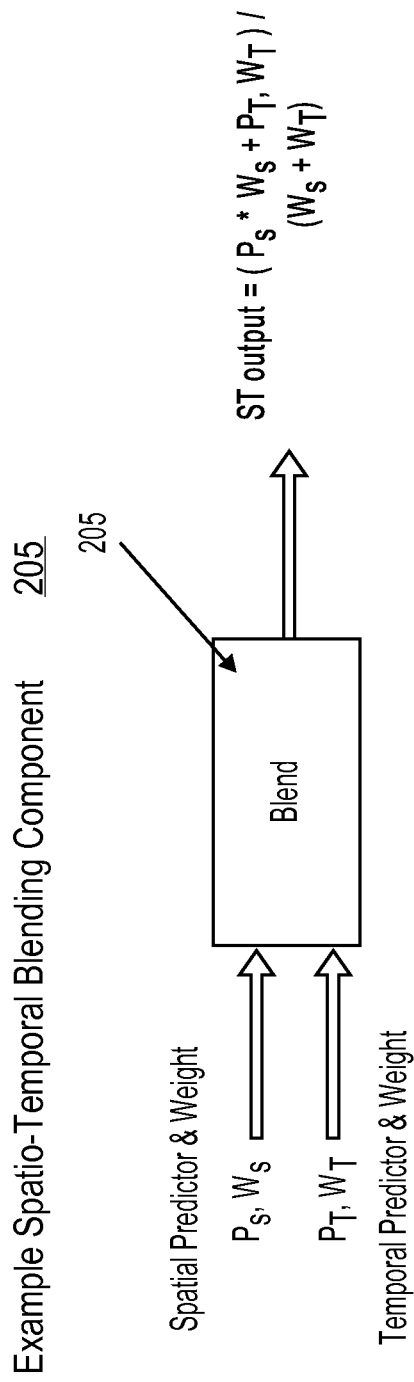
FIG. 5 depicts an example system component, according to an embodiment of the invention.

FIG. 5 depicts spatio-temporal blending component 205, according to an embodiment. As discussed above, temporal predictors $P_T$ and spatial predictors $P_S$ are combined using an inverse score weighting blend with weights $W_T$ and $W_S$ to create a spatio-temporal output ST. In an embodiment, spatio-temporal blending component 205 combines the weighting blended temporal predictors $P_T$ and spatial predictors $P_S$ according to Equation 2, below.

$$ST = (P_T W_T + P_S W_S)/(W_T + W_S) \qquad \text{Equation 2.}$$

A final output check compares the spatial and temporal predictors, which may be used to test for unique situations. For instance, in some cases, such as a rapid motion of a very small object, or multiple motions within a block or other region, a given output pixel may have very different temporal and spatial predictors. In such cases, the temporal predictors may be consistent, but in strong disagreement with the spatial predictor. Consequently, the motion estimates of the block or other region may likely lack accuracy for an affected output pixel thereof. The motion estimate however may be sufficiently accurate for the majority of the pixels with the block. In such special cases, the spatial predictor may be selected as the output.

Example Computer System Platform

Figure 6:
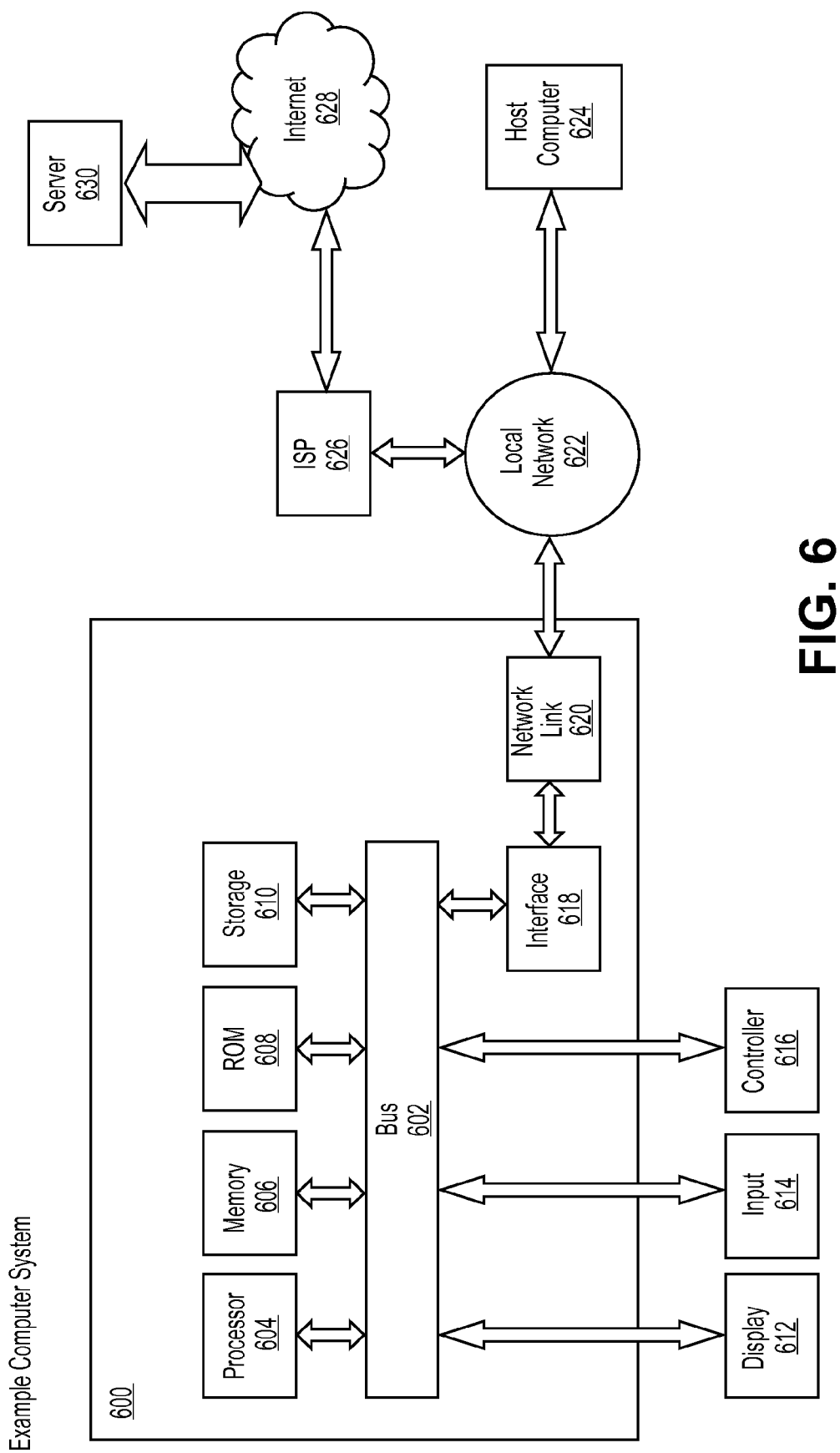
FIG. 6 depicts an example computer system platform, with which an embodiment of the invention may be implemented.

FIG. 6 depicts an example computer system platform 600, with which an embodiment may be implemented. Computer system 600 includes a bus 602 or other communication mechanism for communicating information, and a processor 604 (which may represent one or more processors) coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display (LCD), cathode ray tube (CRT) or the like, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for temporal image prediction. According to one embodiment of the invention, temporal image prediction is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and other conductors and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a digital subscriber line (DSL), cable or other modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for temporal image prediction, as described herein.

The received code may be executed by processor 604 as it is received, and/or stored in storage device 610, or other non-volatile storage for later execution. In this manner, computer system 600 may obtain application code in the form of a carrier wave.

Computer system 600 may be a platform for, or be disposed with or deployed as a component of an electronic device or apparatus. Devices and apparatus that function with computer system 600 for temporal image prediction may include, but are not limited to, a TV or HDTV, a DVD, HD DVD, or BD player or a player application for another optically encoded medium, a player application for an encoded magnetic, solid state (e.g., flash memory) or other storage medium, an audio/visual (A/V) receiver, a media server (e.g., a centralized personal media server), a medical, scientific or other imaging system, professional video editing and/or processing systems, a workstation, desktop, laptop, hand-held or other computer, a network element, a network capable communication and/or computing device such as a cellular telephone, portable digital assistant (PDA), portable entertainment device, portable gaming device, or the like. One or more of the features of computer system 600 may be implemented with an integrated circuit (IC) device, configured for executing the features. The IC may be an application specific IC (ASIC) and/or a programmable IC device such as a field programmable gate array (FPGA) or a microcontroller.

EXAMPLES

In an embodiment, a method comprises or a computer-readable medium carrying one or more sequences of instructions, which instructions, when executed by one or more processors, cause the one or more processors to carry out the steps of: for one or more frames, which sequentially function as a reference frame in a set of frames of the video sequence, accessing a set of motion estimates that includes: a first motion estimate for each region of the reference frame that characterizes motion that is associated with pixels of each of the regions of the reference frame in relation to regions of at least one frame of the frame set, wherein the at least one frame is displaced in time with respect to other frames of the frame set; and at least one additional motion estimate that characterizes motion that is associated with the pixels of each of the regions of the reference frame in relation to regions of at least a second frame of the frame set, wherein the at least a second frame is displaced in time from the at least one frame and from other frames of the frame set; based on an alignment of the regions in the reference frame over the frame set, which corresponds to the first and at least one additional motion estimate, predicting a set of temporal image predictions over the frame set; blending the set of temporal image predictions; and based on the blending step, generating a temporal predictor over the frame set.

In an embodiment, a method or computer-readable medium further comprises providing the temporal predictor to one or more video applications.

In an embodiment, a method or computer-readable medium further comprises interpolating at least one value associated with the motion of the pixels of the reference frame and the at least a second frame wherein the at least one value includes a fractional pixel phase value; and based on the interpolating step, assigning an interpolation based weight to the motion estimates associated with the pixels of the at least one of the one or more frames; wherein the blending step comprises computing the temporal prediction based, at least in part, on the assigned interpolation based weight.

In an embodiment, a method or computer-readable medium further comprises estimating an accuracy associated with each of the motion estimates; and based on the accuracy associated therewith, assigning an accuracy based weight to each of the motion estimates; wherein the blending step comprises computing the temporal prediction based, at least in part, on the assigned accuracy based weight.

In an embodiment, a method or computer-readable medium further comprises based on an estimated noise component associated with compression of each frame in the video image sequence, assigning a compression noise based weight to each of the motion estimates; wherein the blending step comprises computing the finalized temporal prediction based, at least in part, on the compression noise based weight.

In an embodiment, a method or computer-readable medium further comprises estimating the estimated compression noise component; or receiving the estimated compression noise component.

In an embodiment, a method or computer-readable medium further comprises receiving the video stream and the set of motion estimates.

In an embodiment, a method or computer-readable medium further comprises computing a spatial prediction for each of the one or more frames, based on an interpolation of data from the one or more frames; and blending the spatial prediction with the plurality of temporal predictions to generate a spatio-temporal prediction corresponding to the video sequence.

In an embodiment, a method or computer-readable medium further comprises estimating an accuracy associated with the spatial prediction; and based on the accuracy associated therewith, assigning a spatial prediction accuracy based weight to the spatial prediction; wherein the step of blending the spatial and temporal predictions is based, at least in part, on the spatial prediction accuracy based weight.

In an embodiment, a method or computer-readable medium further comprises wherein each of the motion estimates comprises a plurality of values, wherein the plurality of values comprises at least one of: a pair of orthogonally related vector components that describe a translational motion associated with one or more of the regions between one or more of the frames of the segment; an angular component that describes a rotational motion associated with one or more regions between one or more of the frames of the segment; or at least six mapping parameters that describe an affine motion associated with one or more regions between one or more of the frames of the segment.

In an embodiment, a method or computer-readable medium further comprises wherein the accessing step comprises selecting the motion estimates from one or more sources, the sources comprising: a substantially direct motion estimation source; a source of compressed motion estimates; a source of spatially refined motion estimates; or a source of motion estimates that essentially align one or more image features which appear in each of multiple frames of the moving image video sequence, to a reference frame.

In an embodiment, a system comprises a bus; at least one processor coupled to the bus; and a computer readable storage medium coupled to the bus and having one or more sequences of instructions, which when executed by the at least one processor, cause the at least one processor to perform steps that comprise: for one or more frames, which sequentially function as a reference frame in a set of frames of the video sequence, accessing a set of motion estimates that includes: a first motion estimate for each region of the reference frame that characterizes motion that is associated with pixels of each of the regions of the reference frame in relation to regions of at least one frame of the frame set, wherein the at least one frame is displaced in time with respect to other frames of the frame set; and at least one additional motion estimate that characterizes motion that is associated with the pixels of each of the regions of the reference frame in relation to regions of at least a second frame of the frame set, wherein the at least a second frame is displaced in time from the at least one frame and from other frames of the frame set; based on an alignment of the regions in the reference frame over the frame set, which corresponds to the first and at least one additional motion estimate, predicting a set of temporal image predictions over the frame set; blending the set of temporal image predictions; and based on the blending step, generating a temporal predictor over the frame set.

In an embodiment, a system further comprises a buffer associated with the at least one processor; wherein the buffer sequentially stores the frames of the video sequence in a temporally significant order; and wherein the at least one processor accesses the frames of the video sequence from the buffer.

In an embodiment, a system further comprises wherein the instructions further cause the at least one processor to functionally configure a temporal prediction unit, which comprises: an interpolator wherein the interpolator is configured to execute the align and predict steps; wherein the interpolator includes a value interpolator function for interpolating at least one value associated with the motion of the pixels of the reference frame and the at least a second frame wherein the at least one value includes a fractional pixel phase value; and a weight generator wherein the weight generator is configured to assign one or more weights to each of the motion estimates based on at least one of: an accuracy of the temporal predictions; an estimated noise component associated with compression of the video image; or an interpolation associated with the motion of the pixels of the reference frame and the at least a second frame, wherein the interpolation includes a fractional pixel phase value.

In an embodiment, a system further comprises a spatial predictor for predicting a set of spatial predictions associated with each of the image regions among each of the plurality of frames.

In an embodiment, a system further comprises wherein the spatial predictor further assigns a weight to each of the spatial predictions based on an accuracy thereof.

In an embodiment, a system further comprises wherein the instructions further cause the at least one processor to further configure one or more prediction blenders wherein at least one of the one or more prediction blenders is configured to execute at least one the blend of and generate processing functions, wherein the one or more prediction blenders comprises: a region score calculator for calculating an accuracy quality corresponding to each prediction of the sets of temporal and spatial image predictions; and one or more blending generators for: blending one or more of the spatial prediction, the plurality of temporal predictions; wherein the blending is performed based on the accuracy quality associated with the one or more spatial predictions and each of the plurality of temporal predictions; and generating one or more of a finalized temporal prediction or a spatio-temporal prediction corresponding to the video sequence based on the blending.

In an embodiment, an apparatus comprises at least one processor configured for processing the video sequence with steps that include: for one or more frames, which sequentially function as a reference frame in a set of frames of the video sequence, accessing a set of motion estimates that includes: a first motion estimate for each region of the reference frame that characterizes motion that is associated with pixels of each of the regions of the reference frame in relation to regions of at least one frame of the frame set, wherein the at least one frame is displaced in time with respect to other frames of the frame set; and at least one additional motion estimate that characterizes motion that is associated with the pixels of each of the regions of the reference frame in relation to regions of at least a second frame of the frame set, wherein the at least a second frame is displaced in time from the at least one frame and from other frames of the frame set; based on an alignment of the regions in the reference frame over the frame set, which corresponds to the first and at least one additional motion estimate, predicting a set of temporal image predictions over the frame set; blending the set of temporal image predictions; and based on the blending step, generating a temporal predictor over the frame set.

In an embodiment, an apparatus further comprises wherein the steps further includes: computing a spatial prediction for each of the one or more frames, based on an interpolation of data from the one or more frames; and blending the spatial prediction with the plurality of temporal predictions to generate a spatio-temporal prediction corresponding to the video sequence.

In an embodiment, an apparatus further comprises wherein the apparatus comprises at least one of: at least one of a video decoder or encoder; a video editing device; a television; a player application for at least one optically encoded medium; a player application for an encoded storage medium; a player application for a streaming digital signal; a monitor for displaying information from an imaging application; a network element; a portable communication device; a portable entertainment device; an audio/video receiver; a media server; a medical imaging device; a scientific imaging device; or a game playing device.

In an embodiment, a system comprises means for accessing a set of motion estimates for one or more frames in a sequence of video images wherein the set of motion estimates includes: a first motion estimate for each region of the reference frame that characterizes motion that is associated with pixels of each of the regions of the reference frame in relation to regions of at least one frame of the frame set, wherein the at least one frame is displaced in time with respect to other frames of the frame set; and at least one additional motion estimate that characterizes motion that is associated with the pixels of each of the regions of the reference frame in relation to regions of at least a second frame of the frame set, wherein the at least a second frame is displaced in time from the at least one frame and from other frames of the frame set; means for predicting a set of temporal image predictions over the frame set based on an alignment of the regions in the reference frame over the frame set, which corresponds to the first and at least one additional motion estimate; means for blending the set of temporal image predictions; and means for generating a temporal predictor over the frame set based on the blending step.

In an embodiment, a system further comprises means for computing a spatial prediction for each of the one or more frames, based on an interpolation of data from the one or more frames; and means for blending the spatial prediction with the plurality of temporal predictions to generate a spatio-temporal prediction corresponding to the video sequence.

In an embodiment, a system further comprises means for interpolating values associated with the motion of the pixels of the reference frame and the at least a second frame based on the filter function wherein the values include a fractional pixel phase value; and at least one means for generating weighting values, wherein the weighting values include one or more of: one or more weights associated with each of the motion estimates based on at least one of: an accuracy of the temporal predictions; an estimated noise component associated with compression of the video image; an interpolation associated with the motion of the pixels of the reference frame and the at least a second frame, wherein the interpolation includes a fractional pixel phase value; or an accuracy associated with the spatial prediction.

Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing images of a video sequence, comprising the steps of:
   for one or more frames, which sequentially function as a reference frame in a set of frames of the video sequence, accessing a set of motion estimates that includes:
      a first motion estimate for each region of the reference frame that characterizes motion that is associated with pixels of each of the regions of the reference frame in relation to regions of at least one frame of the frame set, wherein the at least one frame is displaced in time with respect to other frames of the frame set; and
      at least one additional motion estimate that characterizes motion that is associated with the pixels of each of the regions of the reference frame in relation to regions of at least a second frame of the frame set, wherein the at least a second frame is displaced in time from the at least one frame and from other frames of the frame set;
   based on an alignment of the regions in the reference frame over the frame set, which corresponds to the first and at least one additional motion estimate, predicting a set of temporal image predictions over the frame set;
   blending the set of temporal image predictions; and
   based on the blending step, generating a temporal predictor over the frame set.

2. The method as recited in claim 1 further comprising:
   providing the temporal predictor to one or more video applications.

3. The method as recited in claim 1, further comprising the steps of:
   interpolating at least one value associated with the motion of the pixels of the reference frame and the at least a second frame wherein the at least one value includes a fractional pixel phase value; and
   based on the interpolating step, assigning an interpolation based weight to the motion estimates associated with the pixels of the at least one of the one or more frames;
   wherein the blending step comprises computing the temporal prediction based, at least in part, on the assigned interpolation based weight.

4. The method as recited in claim 1, further comprising the steps of:
   estimating an accuracy associated with each of the motion estimates; and
   based on the accuracy associated therewith, assigning an accuracy based weight to each of the motion estimates;
   wherein the blending step comprises computing the temporal prediction based, at least in part, on the assigned accuracy based weight.

5. The method as recited in claim 1, further comprising the step of:
   based on an estimated noise component associated with compression of each frame in the video image sequence, assigning a compression noise based weight to each of the motion estimates;

wherein the blending step comprises computing the fmalized temporal prediction based,
at least in part, on the compression noise based weight.

6. The method as recited in claim 5, further comprising at least one of the steps of:
estimating the estimated compression noise component; or
receiving the estimated compression noise component.

7. The method as recited in claim 1, further comprising the steps of:
receiving the video stream and the set of motion estimates.

8. The method as recited in claim 1, further comprising the steps of:
computing a spatial prediction for each of the one or more frames, based on an interpolation of data from the one or more frames; and
blending the spatial prediction with the plurality of temporal predictions to generate a spatio-temporal prediction corresponding to the video sequence.

9. The method as recited in claim 8, further comprising the steps of:
estimating an accuracy associated with the spatial prediction; and
based on the accuracy associated therewith, assigning a spatial prediction accuracy based weight to the spatial prediction;
wherein the step of blending the spatial and temporal predictions is based, at least in part, on the spatial prediction accuracy based weight.

10. The method as recited in claim 1 wherein each of the motion estimates comprises a plurality of values, wherein the plurality of values comprises at least one of:
a pair of orthogonally related vector components that describe a translational motion associated with one or more of the regions between one or more of the frames of the segment;
an angular component that describes a rotational motion associated with one or more regions between one or more of the frames of the segment; or
at least six mapping parameters that describe an affine motion associated with one or more regions between one or more of the frames of the segment.

11. The method as recited in claim 1 wherein the accessing step comprises selecting the motion estimates from one or more sources, the sources comprising:
a substantially direct motion estimation source;
a source of compressed motion estimates;
a source of spatially refined motion estimates; or
a source of motion estimates that essentially align one or more image features which appear in each of multiple frames of the moving image video sequence, to a reference frame.

12. A computer based system for processing a video signal, comprising:
a bus;
at least one processor coupled to the bus; and
a non-transitory computer readable medium coupled to the bus and having one or more sequences of instructions, which when executed by the at least one processor, cause the at least one processor to perform steps that comprise:
for one or more frames, which sequentially function as a reference frame in a set of frames of the video sequence, accessing a set of motion estimates that includes:
a first motion estimate for each region of the reference frame that characterizes motion that is associated with pixels of each of the regions of the reference frame in relation to regions of at least one frame of the frame set, wherein the at least one frame is displaced in time with respect to other frames of the frame set; and
at least one additional motion estimate that characterizes motion that is associated with the pixels of each of the regions of the reference frame in relation to regions of at least a second frame of the frame set, wherein the at least a second frame is displaced in time from the at least one frame and from other frames of the frame set;
based on an alignment of the regions in the reference frame over the frame set, which corresponds to the first and at least one additional motion estimate, predicting a set of temporal image predictions over the frame set;
blending the set of temporal image predictions; and
based on the blending step, generating a temporal predictor over the frame set.

13. The system as recited in claim 12, the system further comprising:
a buffer associated with the at least one processor;
wherein the buffer sequentially stores the frames of the video sequence in a temporally significant order; and
wherein the at least one processor accesses the frames of the video sequence from the buffer.

14. The system as recited in claim 12 wherein the instructions further cause the at 1least one processor to functionally configure a temporal prediction unit, which comprises:
an interpolator wherein the interpolator is configured to execute the align and predict steps;
wherein the interpolator includes a value interpolator function for interpolating at least one value associated with the motion of the pixels of the reference frame and the at least a second frame wherein the at least one value includes a fractional pixel phase value; and
a weight generator wherein the weight generator is configured to assign one or more weights to each of the motion estimates based on at least one of:
an accuracy of the temporal predictions;
an estimated noise component associated with compression of the video image; or
an interpolation associated with the motion of the pixels of the reference frame and the at least a second frame, wherein the interpolation includes a fractional pixel phase value.

15. The system as recited in claim 12 further comprising:
a spatial predictor for predicting a set of spatial predictions associated with each of the image regions among each of the plurality of frames.

16. The system as recited in claim 15 wherein the spatial predictor further assigns a weight to each of the spatial predictions based on an accuracy thereof.

17. The system as recited in claim 16 wherein the instructions further cause the at least one processor to further configure one or more prediction blenders wherein at least one of the one or more prediction blenders is configured to execute at least one the blend of and generate processing functions, wherein the one or more prediction blenders comprises:
a region score calculator for calculating an accuracy quality corresponding to each prediction of the sets of temporal and spatial image predictions; and
one or more blending generators for:
blending one or more of the spatial prediction, the plurality of temporal predictions;
wherein the blending is performed based on the accuracy quality associated with the one or more spatial predictions and each of the plurality of temporal predictions; and generating one or more of a finalized temporal prediction or a spatio-temporal prediction corresponding to the video sequence based on the blending.

18. A video processing apparatus, comprising:
at least one processor configured for processing the video sequence with steps that include:
for one or more frames, which sequentially function as a reference frame in a set of frames of the video sequence, accessing a set of motion estimates that includes:
   a first motion estimate for each region of the reference frame that characterizes motion that is associated with pixels of each of the regions of the reference frame in relation to regions of at least one frame of the frame set, wherein the at least one frame is displaced in time with respect to other frames of the frame set; and
   at least one additional motion estimate that characterizes motion that is associated with the pixels of each of the regions of the reference frame in relation to regions of at least a second frame of the frame set, wherein the at least a second frame is displaced in time from the at least one frame and from other frames of the frame set;
based on an alignment of the regions in the reference frame over the frame set, which corresponds to the first and at least one additional motion estimate, predicting a set of temporal image predictions over the frame set;
blending the set of temporal image predictions; and
based on the blending step, generating a temporal predictor over the frame set.

19. The apparatus as recited in claim 18 wherein the steps further includes:
computing a spatial prediction for each of the one or more frames, based on an interpolation of data from the one or more frames; and
blending the spatial prediction with the plurality of temporal predictions to generate a spatio-temporal prediction corresponding to the video sequence.

20. The apparatus as recited in claim 19 wherein the apparatus comprises at least one of:
at least one of a video decoder or encoder;
a video editing device;
a television;
a player application for at least one optically encoded medium;
a player application for an encoded storage medium;
a player application for a streaming digital signal;
a monitor for displaying information from an imaging application;
a network element;
a portable communication device;
a portable entertainment device;
an audio/video receiver;
a media server;
a medical imaging device;
a scientific imaging device; or
a game playing device.

21. A non-transitory computer readable medium having encoded instructions which, when executed with one or more processors of a computer system, cause the processors to execute the steps of:
for one or more frames, which sequentially function as a reference frame in a set of frames of the video sequence, accessing a set of motion estimates that includes:
   a first motion estimate for each region of the reference frame that characterizes motion that is associated with pixels of each of the regions of the reference frame in relation to regions of at least one frame of the frame set, wherein the at least one frame is displaced in time with respect to other frames of the frame set; and
   at least one additional motion estimate that characterizes motion that is associated with the pixels of each of the regions of the reference frame in relation to regions of at least a second frame of the frame set, wherein the at least a second frame is displaced in time from the at least one frame and from other frames of the frame set;
based on an alignment of the regions in the reference frame over the frame set, which corresponds to the first and at least one additional motion estimate, predicting a set of temporal image predictions over the frame set;
blending the set of temporal image predictions; and
based on the blending step, generating a temporal predictor over the frame set.

22. The non-transitory computer readable medium as recited in claim 21 wherein the encoded instructions, when executed by the at least one processor, further cause the at least one processor to perform the steps of:
computing a spatial prediction for each of the one or more frames, based on an interpolation of data from the one or more frames; and
blending the spatial prediction with the plurality of temporal predictions to generate a spatio-temporal prediction corresponding to the video sequence.

23. A system, comprising:
means for accessing a set of motion estimates for one or more frames in a sequence of video images wherein the set of motion estimates includes:
   a first motion estimate for each region of the reference frame that characterizes motion that is associated with pixels of each of the regions of the reference frame in relation to regions of at least one frame of the frame set, wherein the at least one frame is displaced in time with respect to other frames of the frame set; and
   at least one additional motion estimate that characterizes motion that is associated with the pixels of each of the regions of the reference frame in relation to regions of at least a second frame of the frame set, wherein the at least a second frame is displaced in time from the at least one frame and from other frames of the frame set;
means for predicting a set of temporal image predictions over the frame set based on an alignment of the regions in the reference frame over the frame set, which corresponds to the first and at least one additional motion estimate;
means for blending the set of temporal image predictions; and
means for generating a temporal predictor over the frame set based on the blending step.

24. The system as recited in claim 23, further comprising:
means for computing a spatial prediction for each of the one or more frames, based on an interpolation of data from the one or more frames; and
means for blending the spatial prediction with the plurality of temporal predictions to generate a spatio-temporal prediction corresponding to the video sequence.

25. The system as recited in claim 24, further comprising:
means for interpolating values associated with the motion of the pixels of the reference frame and the at least a second frame based on the filter function wherein the values include a fractional pixel phase value; and
at least one means for generating weighting values, wherein the weighting values include one or more of:

one or more weights associated with each of the motion estimates based on at least one of:
an accuracy of the temporal predictions;
an estimated noise component associated with compression of the video image;
an interpolation associated with the motion of the pixels of the reference frame and the at least a second frame, wherein the interpolation includes a fractional pixel phase value; or
an accuracy associated with the spatial prediction.

* * * * *